3,331,777
GLASS FRITS AND ENAMELS HAVING ESTERIFIED SURFACES AND THEIR PREPARATION
Lewis C. Hoffman, Wilmington, Del., assignor to E. I. du Pont de Nemours and Company, Wilmington, Del., a corporation of Delaware
No Drawing. Filed July 31, 1964, Ser. No. 386,789
11 Claims. (Cl. 252—62.1)

This invention relates to glass frits and vitreous enamels particularly suitable for use in decorating glass by electrostatic methods, and to their production.

The terms "vitreous enamel" and "enamel" are used herein to mean an enamel in particulate form consisting essentially of a glass frit and an inorganic heat resistant pigment. When such an enamel is applied to glass, e.g., in the form of a design, and caused to be fused thereon, a permanent decoration on the glass results.

In electrostatic enamel decorating methods, an electrostatic field established between two oppositely charged electrically conductive surfaces or electrodes is used to effect or assist transfer of dry enamel powder from one electrically conductive surface to another. The electrode to which the particles are delivered may be the glass object to be decorated (e.g., a hot bottle from a bottle molding operation) or an offset plate. If an offset plate is employed, the enamel particles are passed through a stencil screen having therein a desired design so as to form on the plate a powder enamel design which is the mirror image of the design desired on the glass to be decorated, and the enamel design is then transferred from the plate to the glass. If no offset plate is to be used, the powder enamel is transferred through a stencil screen having therein the desired design directly to the glass to be decorated, e.g., a hot bottle.

In such electrostatic methods, it is highly important if not essential that the powder material applied through the stencil have a fairly definite particle size distribution pattern between the limits of about 1 and 45, preferably about 3 and 30, microns in diameter. Since efficient and effective pigmentation of the decoration requires use of the pigment in particle sizes much too fine for effective handling in electrostatic methods if physical mixtures of such fine pigment particles and frit particles were used, enamel particles of the desired particle size distribution are employed, which enamel particles are composites of the usual lead borosilicate type glass frit and such fine pigment particles.

It is sometime desired to apply and fire on an unpigmented coating, in which case electrostatic methods may be used to apply a powder lead borosilicate glass frit (unpigmented) having a suitable particle size distribution pattern as indicated above to the glass object to be coated.

An image formed from such powdered frit particles or such composite frit-pigment enamel particles on an electrically conductive offset plate will transfer to a hot glass surface when the image is made the dielectric in a high voltage electric field between the plate and the glass surface. It is not known whether such images develop an excess charge of the same sign as the plate by electron or proton transfer or whether they are merely polarized and form dipoles which are repelled from the plate. In either case, the powder image must possess a certain electrical conductivity for effective electrostatic transfer of the powder image from the plate to the glass surface to occur.

The dielectric frit powder or composite enamel powder is effectively transferred from the offset plate to the glass surface in the electrostatic process because the individual particles are covered with moisture films providing sites of electrical conductivity. When the powder is heated, its conductivity remains essentially unchanged up to the boiling point of water. At that point, however, its conductivity drops to zero. Glass develops an appreciable conductivity at still higher temperatures as the result of the mobility of ions, particularly alkali ions, but such ionic conductivity does not result in successful electrostatic transfer.

Since the electrostatic process depends upon the powder particles acquiring either a charge or a dipole character from the offset plate, evaporation of the moisture films from the particles makes the powder non-transferable or inactive. The particles of the powder only contact each other at points throughout the powder mass. Since these points of contact are the conductive paths between paricles, here must be sufficient moisture present to provide conductivity at such points. Enamel and frit powders normally contain about 0.3% water and evaporation of only about half that amount changes the powder from an active to an inactive one, presumably because insufficient water remains to render the powder conductive at the points of contact.

The moisture films of the powder tend to become evaporated in electrostatic methods by the heat from hot glass being decorated, or by the powder being exposed to ambient conditions of low relative humidity or high temperatures.

In offset decorating operations wherein hot glass is contacted in an electrostatic field with the powder image on the offset plate, it has been determined that transfer of the image from the plate to the glass begins to fail when the contact with the hot glass raises the temperature of the powder to about 190° F. (88° C). A glass surface temperature of about 1100 to 1200° F. (593 to 649° C.) is required for sufficient heat transfer to occur to bring about such result. Transfer failure resulting from loss of moisture due to exposure at lower temperatures to ambient conditions of low relative humidity is generally referred to as "fatigue." When such relative humidity is 50% or higher, the powder will generally maintain its transferability, i.e., will not develop fatigue, even though continuously exposed. Even the violent mechanical abrasion brought about by brushing the powder through a stencil screen onto the offset plate in forming the powder image on the plate fails to cause sufficient evaporation of moisture to result in difficulties. When the ambient relative humidity is lower than 40%, powder exposed to the air loses its transferability very quickly. Deterioration of transfer properties at 40% relative humidity and 70° F. (21° C.) is noticeable in about an hour and deterioration occurs more rapidly at lower relative humidities. Thus, there is a distinct need for glass frit and composite enamel powders whose utility in electrostatic decorating methods is independent, or relatively so, of relative humidity conditions.

It is therefore an object of the invention to provide improved glass frit and composite enamel powders whose utility in electrostatic decorating methods is relatively independent of the relative humidity of the atmosphere in which they are used. A further object is to provide improved glass frit and enamel powders whose transferability in electrostatic decorating methods is relatively insensitive to their moisture contents or the moisture content of the atmosphere in which they are used. A still further object is to provide a practical way of making such improved powders.

The powders of the invention are lead borosilicate glass frit powders and composite pigment-lead borosilicate frit powders having an esterified surface resulting from reacting the untreated original particles of the powder with an alcohol of the group of alcohols listed below or a mixture of one or more of such alcohols. The reaction to produce the esterified surface can be effected in any desired manner. Effective esterification can be effected simply by refluxing the alcohol in contact with the enamel or frit powder for 15 to 45 minutes. A more practical and preferred way is to mill the powder in a large excess of the alcohol for 2 to 20 hours, after which the reacted powder is washed, e.g., with a lower alcohol such as ethanol, to remove unreacted alcohol and then dried.

The reaction of the powder with the alcohol appears to involve the partial or complete replacement of moisture films by layers of alkoxy groups chemically attached to the powder surfaces. That the layer or coating of alkoxy groups is chemically attached is evidenced by the stability of the coating to mechanical abuse and the failure of known solvents for the alcohol precursor to remove the coating from the powder. The esterified powder, for example, can be slurried in water, ethanol or trichloroethylene and allowed to remain in contact with the solvent overnight, yet after removing the solvent by filtering and drying, the powder will exhibit its original resistance to the development of fatigue under low humidity conditions.

Many alcohols of various kinds were used to treat a lead borosilicate-based enamel powder. In each instance, the powder was ball milled in a large excess of the alcohol for 2 hours, following which it was filtered off, washed with ethanol and dried. The treated powders were then tested for transferability on an inclined plane electrostatic transfer apparatus in which glass vials were rolled down an inclined plane so as to roll over a charged aluminum offset plate on which had been stenciled a powder image to be transferred to the glass vial.

The vials were grounded through the rails and were heated before transfer to temperatures of 600° C. (1112° F.) to 700° C. (1292° F.). The offset plate with the powder image thereon was charged oppositely to the hot vials so that an electrostatic charge of about 3500 volts existed between the two. Unless the powder were sensitive to the absence of moisture, the powder image on the offset plate would be transferred by the electrostatic charge from the plate to the hot vial as the latter contacted the image when it was rolled down the inclined plane.

If the alcohol-treated powder showed acceptable transfer in the above test, it was then heated at 121° C. (250° F.) for 1 hour, cooled to room temperature in a constant humidity chamber maintained at 40% relative humidity, and then retested. If the esterified (alcohol-treated) powder resulted in a transfer of at least 60% of the design area in such retest, the esterification was regarded as worthwhile in inhibiting or preventing electrostatic fatigue.

Of the many alcohols tested only the following were found to give esterfied powder surfaces sufficiently resistant to fatigue to be worthwhile.

| Alcohol: | Boiling point, ° C. |
|---|---|
| Ethyleneglycol mono-n-butyl ether | 168 |
| Ethyleneglycol mono phenylether | 237 |
| Diethylene glycol monomethyl ether | 194 |
| Diethylene glycol monoethyl ether | 196 |
| Dodecyl alcohol | 255 |
| Tetradecyl alcohol | 263 |
| Hexadecyl alcohol | 190 |
| Octadecyl alcohol | 211 |
| Diethylene glycol mono-n-butyl ether | 232 |
| Beta terpineol | 220 |
| Alpha terpineol | 220 |
| Pine oil (mixture of α- and β-terpineols). | |

The enamel powders esterified with all of the alcohols listed above exhibited improved resistance to fatigue, i.e., at least 60% of the design area was transferred in the above retest. Those esterified with the last 4 of the listed alcohols were, however, distinctly superior to the others and resulted in transfers of at least 90% of the design area in the retest. Esterification using a mixture of equal parts of diethylene glycol mono-n-butyl ether and pine oil or a terpineol gave essentially fatigue-proof enamel powders, i.e., their transfer was essentially unaffected by conditions of low relative humidity, and the use of mixtures of these alcohols is preferred.

The following alcohols were also tested as described above but all were found to be essentially completely ineffective for the present purpose: methanol, ethanol, amyl alcohol, isopropanol, 2-octanol, ethylene glycol, n-hexyl alcohol, glycerol, benzyl alcohol, diethylene glycol, hexamethyene glycol, polyvinyl alcohol, hexylene glycol, cyclopentanol, 2,6,8-trimethyl nonanol-4, polypropylene glycol, polyethylene glycol monostearate and ethylene glycol monostearate.

The enamel powder employed in testing the above alcohols consisted of particles which were composites of a white $TiO_2$ pigment and a lead borosilicate glass frit. The pigment component was dispersed in the frit phase of the particles with the composite consisting of 10% pigment and 90% frit. The composition of the frit was:

| | Percent |
|---|---|
| PbO | 56.9 |
| $SiO_2$ | 27.1 |
| $B_2O_3$ | 5.5 |
| $TiO_2$ | 0.8 |
| $ZrO_2$ | 4.2 |
| $Na_2O$ | 3.8 |
| ZnO | 1.7 |

Essentially the same test results as reported above were obtained when using the above alcohols to esterify unpigmented frit powder of the above composition. Also, the above frit or composite enamel powders which were esterified by refluxing the alcohols in contact with the powder for 15 to 45 minutes gave essentially the same test results as did powders which were esterified by milling with the alcohol.

The pigment used in the composite enamel will generally constitute about 5 to 20% of the enamel weight with the balance being essentially frit. Any of the usual refractory pigments may be employed including titanium dioxide used for whites; the spinels used for blues, blacks browns and greens; cadmium sulfide used for yellow and the cadmium sulfoselenides used for red and orange colors.

The glass frit employed, whether pigmented or not, should be a lead borosilicate. Such frits will generally be composed of:

| | Percent |
|---|---|
| PbO | 50–80 |
| $SiO_2$ | 10–30 |
| $B_2O_3$ | 5–15 |
| $TiO_2$ | 0–5 |
| $ZrO_2$ | 0–5 |
| $Na_2O$ | 0–5 |
| NaF | 0–5 |
| $PbF_2$ | 0–10 |
| CdO | 0–5 |
| ZnO | 0–20 | with the above named oxides constituting at least 90% of the weight of the frit.

An untreated powder enamel (with adsorbed moisture films) will show a characteristic weight loss as its temperature is raised through the boiling point of water, and an additional weight loss occurs as the temperature is increased further. The loss at 100° C. (212° F.) amounts to from 0.1 to 0.2%, and in order to reach constant weight, it is necessary to heat the powder to 300 to 400° C. (572–752° F.) where a further loss of about 0.1% results. The former loss is regarded as the loss of mechanically held water which still has its normal boiling point, while the latter is thought to represent loss of chemically sorbed or combined water (hydroxyl groups) which requires additional energy for evaporation.

When as esterified powder is heated, it shows a single weight loss at a temperature somewhat above the boiling point of the parent alcohol but below the pyrolysis temperature. Thus, a lead borosilicate-based enamel esterified with diethylene glycol mono-n-butyl ether, when heated at the rate of 20° C. (36° F.) per minute, showed a weight loss of 0.24% at 310° C. (590° F.). It showed no loss at lower temperatures but at 500 to 550° C. (932–1022° F.) an additional loss of 0.14% resulted and was accompanied by surface blackening from the pyrolysis of the esterified surface.

All parts and composition percentages reported herein are by weight.

The embodiments of the invention in which an exclusive property or privilege is claimed are as follows:

1. A powder exhibiting improved electrostatic transfer performance under low humidity conditions, said powder consisting essentially of particles selected from the group consisting of lead borosilicate frit particles and composite lead borosilicate-based enamel particles, said selected particles having surfaces which have been esterified by reaction with an excess of an alcohol of the group consisting of:

Eethyleneglycol mono-n-butyl ether
Ethyleneglycol mono phenylether
Diethylene glycol monomethyl ether
Diethylene glycol monoethyl ether
Dodecyl alcohol
Tetradecyl alcohol
Hexadecyl alcohol
Octadecyl alcohol
Diethylene glycol mono-n-butyl ether
Beta terpineol
Alpha terpineol
Pine oil, and mixtures thereof.

2. A powder according to claim 1 wherein the surfaces of the selected particles have been esterified by reaction with pine oil.

3. A powder according to claim 1 wherein the surfaces of the selected particles have been esterified by reaction with diethylene glycol mono-n-butyl ether.

4. A powder according to claim 1 wherein the surfaces of the selected particles have been esterified by reaction with a mixture of pine oil and diethylene glycol mono-n-butyl ether.

5. An enamel powder exhibiting improved electrostatic transfer performance under low humidity conditions, said powder consisting essentially of lead borosilicate-based enamel particles whose surfaces have been esterified by reaction with a mixture of pine oil and diethylene glycol mono-n-butyl ether.

6. The method of improving the electrostatic transfer performance of particles selected from the group consisting of lead borosilicate frit particles and composite lead borosilicate-based enamel particles comprising reacting said selected particles with an excess of an alcohol of the group consisting of:

Ethylene glycol mono-n-butyl ether
Ethylene glycol mono phenylether
Diethylene glycol monomethyl ether
Diethylene glycol monoethyl ether
Dodecyl alcohol
Tetradecyl alcohol
Hexadecyl alcohol
Octadecyl alcohol
Diethylene glycol mono-n-butyl ether
Beta terpineol
Alpha terpineol
Pine oil, and mixtures thereof, thereby forming an esterified surface on said selected particles.

7. The method of claim 6 wherein the reaction of the selected particles with the alcohol is effected by refluxing the alcohol in contact with the selected particles.

8. The method of claim 6 wherein the reaction of the selected particles with the alcohol is effected by milling the selected particles in an excess of the alcohol.

9. The method of improving the electrostatic transfer performance of a composite lead borosilicate-based enamel powder comprising milling the enamel powder in an excess of pine oil, thereby effecting reaction of said pine oil with said enamel powder to form an esterified surface on the particles of said powder.

10. The method of improving the electrostatic transfer performance of a composite lead borosilicate-based enamel powder comprising milling the enamel powder in an excess of diethylene glycol mono-n-butyl ether, thereby effecting reaction of said enamel powder with said diethylene glycol mono-n-butyl ether to form an esterified surface on the particles of said powder.

11. The method of improving the electrostatic transfer performance of a composite lead borosilicate-based enamel powder comprising milling the enamel powder in an excess of a mixture of pine oil and diethylene glycol mono-n-butyl ether, thereby effecting reaction of said mixture with said enamel powder to form an esterified surface on the particles of said powder.

References Cited

UNITED STATES PATENTS 2,657,149  10/1953  Iler _____ 106—308
2,736,669  2/1956   Goebel _____ 106—308

TOBIAS E. LEVOW, *Primary Examiner.*

HELEN M. McCARTHY, J. E. POER,
*Assistant Examiners.*